(12) United States Patent
Schroeck et al.

(10) Patent No.: US 8,768,544 B2
(45) Date of Patent: Jul. 1, 2014

(54) SYSTEM AND METHOD FOR CONTROLLING A VEHICLE CONSIST

(75) Inventors: Brian Schroeck, Melbourne, FL (US); Jared Klineman Cooper, Melbourne, FL (US); Eugene Smith, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 13/198,091

(22) Filed: Aug. 4, 2011

(65) Prior Publication Data

US 2013/0035811 A1 Feb. 7, 2013

(51) Int. Cl.
*G05D 1/00* (2006.01)
*G05D 3/00* (2006.01)
*G06F 7/00* (2006.01)
*G06F 17/00* (2006.01)
*B60L 15/42* (2006.01)

(52) U.S. Cl.
CPC ..................... *B60L 15/42* (2013.01)
USPC .................. 701/19; 701/1; 701/20

(58) Field of Classification Search
CPC ........................................ B60L 15/42
USPC .................. 701/1, 2, 19–20, 22–27
See application file for complete search history.

(56) References Cited

U.S. PATENT DOCUMENTS

| | | | | |
|---|---|---|---|---|
| 5,950,967 | A | * | 9/1999 | Montgomery ............ 246/182 R |
| 6,374,165 | B2 | * | 4/2002 | Oguma et al. .................. 701/19 |
| 6,691,957 | B2 | * | 2/2004 | Hess et al. ..................... 246/186 |
| 8,406,943 | B2 | * | 3/2013 | Brand et al. .................... 701/19 |
| 2007/0219680 | A1 | * | 9/2007 | Kumar et al. ................... 701/19 |
| 2010/0241295 | A1 | * | 9/2010 | Cooper et al. .................. 701/19 |
| 2011/0060486 | A1 | * | 3/2011 | Meltser et al. ................. 701/19 |
| 2011/0099413 | A1 | * | 4/2011 | Cooper et al. ................ 714/4.1 |
| 2011/0270475 | A1 | * | 11/2011 | Brand et al. .................... 701/20 |

* cited by examiner

*Primary Examiner* — Bhavesh V Amin
(74) *Attorney, Agent, or Firm* — GE Global Patent Operation; John A. Kramer (57) ABSTRACT

A system includes first and second control modules, an energy management module, and an arbitration module. The first and second control modules are on-board first and second powered vehicles coupled by at least a third vehicle in a vehicle consist. The first control module forms control signals to coordinate tractive efforts provided by the vehicle consist. The energy management module is on-board the second powered vehicle and is communicatively coupled with the second control module. The energy management module forms control signals that are transmitted by the second control module to control the tractive efforts provided by the first powered vehicle and the second powered vehicle based on a trip profile associated with a trip of the vehicle consist. The arbitration module is communicatively coupled with the first and second control modules. The arbitration module determines which of the control modules controls the tractive efforts provided by the vehicle consist.

28 Claims, 4 Drawing Sheets

SYSTEM AND METHOD FOR CONTROLLING A VEHICLE CONSIST

FIELD OF THE INVENTION

One or more embodiments described herein relate to vehicle consists (two or more vehicles coupled together to travel along a route).

BACKGROUND OF THE INVENTION

A vehicle "consist" is a group of two or more vehicles (e.g., at least one powered vehicle, capable of self-propulsion, and possibly additionally one or more non-powered vehicles, incapable of self-propulsion) that are mechanically coupled or linked together to travel along a route. For example, locomotives in a train consist include a lead locomotive and one or more remote or trailing locomotives. The locomotives generate tractive effort to propel the consist. Some known consists include locomotives arranged to provide a distributed power (DP) operation of the consist. In a DP system, locomotives are located at intermediate points along the length of the train and a lead locomotive (referring to a locomotive that is designated for operational control, which can be at the front end of the train or otherwise) remotely controls the locomotives in the consist. The DP operation of a consist can allow for longer consists having more locomotives and other rail cars as the motive power supplied by the locomotives is distributed throughout the length of the consist.

Control systems can be installed into a locomotive of a consist to permit the locomotive to remotely control the locomotives of the consist according to one or more predetermined factors. For example, the control system may be an energy management system that controls the locomotives based on a trip or mission plan that includes throttle settings of the locomotives based on details of an upcoming trip of the consist. The locomotive having the energy management system may control the other locomotives according to the trip or mission plan in order to reduce the fuel consumed by the consist during the trip, or for other objectives.

However, in order to make use of a locomotives having the control system, some known consists require that the locomotive be disposed at the front end of the consist as the lead locomotive. For example, the lead locomotive may be configured to primarily control the locomotives in the DP operation or by using the control system. Not all locomotives may have such control systems. For example, due to the financial and/or time cost involved in upgrading or purchasing locomotives with the control systems, a relatively small percentage of the locomotives may have the control systems. As a result, effort must be taken to arrange the consist so that a locomotive outfitted with the control system is at the front end of the consist. In relatively crowded rail yards, however, arranging the locomotives with the energy management or other control systems at the front ends of the consists may be extremely difficult to organize and arrange. As a result, significant time and effort may be expended on ensuring that the locomotives having the control systems are always disposed at the front ends of the consists.

A need exists for a system and method for controlling vehicle consists that avoids or reduces the efforts required to permit locomotives having certain control systems to control other locomotives of the same consist.

BRIEF DESCRIPTION OF THE INVENTION

In one embodiment, a system includes first and second control modules, an energy management module, and a control arbitration module. The first and second control modules are configured to be disposed on-board first and second powered vehicles that are mechanically coupled with each other by at least a third vehicle in a vehicle consist. The first control module is configured to form control signals to coordinate tractive efforts provided by the vehicle consist. The energy management module is configured to be disposed on-board the second powered vehicle and is configured to be communicatively coupled with the second control module. The energy management module is configured to form control signals that are transmitted by the second control module to control the tractive efforts provided by the first powered vehicle and the second powered vehicle based on a trip profile associated with a trip of the vehicle consist. The control arbitration module is configured to be communicatively coupled with the first and second control modules. The control arbitration module is configured to determine which of the first and second control modules controls the tractive efforts provided by the vehicle consist.

In another embodiment, a method includes on a first powered vehicle of a vehicle consist, controlling tractive efforts provided by the first powered vehicle and a different, second powered vehicle of the vehicle consist. The first powered vehicle and the second powered vehicle are mechanically coupled by at least a third vehicle. The method also includes switching control of the tractive efforts provided by the first powered vehicle and the second powered vehicle from the first powered vehicle to the second powered vehicle and, on the second powered vehicle, controlling the tractive efforts provided by the first powered vehicle and the second powered vehicle based on a trip profile of a trip of the vehicle consist.

In another embodiment, another system includes a first control module that is configured for operative coupling on-board a first powered vehicle of a vehicle consist. The first control module is further configured to generate first control signals that control tractive efforts provided by the first powered vehicle and a different, second powered vehicle of the vehicle consist. The first powered vehicle and the second powered vehicle are mechanically coupled by at least a third vehicle. The first control module is configured to cede control of the tractive efforts to a second control module that is operatively coupled with, and receives second control signals from, an energy management module disposed on-board the second powered vehicle based on receipt of a command signal. The second control signals control the tractive efforts provided by the first powered vehicle and the second powered vehicle.

In another embodiment, another system is provided that includes an energy management module and a control arbitration module. The energy management module is configured to be operatively coupled on-board a second powered vehicle and is configured to generate first control signals that control the tractive efforts provided by a different, first powered vehicle and the second powered vehicle based on a trip profile associated with a trip of a vehicle consist. The vehicle consist includes the first powered vehicle and the second powered vehicle mechanically coupled with each other and separated by at least a third vehicle. The control arbitration module is configured to be communicatively coupled with the energy management module and with a first control module disposed on-board the first powered vehicle to generate second control signals that control the tractive efforts provided by the first powered vehicle and the second powered vehicle. The control arbitration module is configured to determine which of the first control module and the energy management module generates the first control signals or the second control signals that control the tractive efforts provided by the first powered vehicle and the second powered vehicle.

In another embodiment, a control arbitration module includes a communication submodule, a monitoring submodule, and a switching submodule. The communication submodule is configured to communicate with a first control module disposed on-board a first powered vehicle of a vehicle consist and with a second control module disposed on-board a different, second powered vehicle of the vehicle consist that is mechanically coupled with and separated from the first powered vehicle by at least a third vehicle. The first control module is configured to generate first control signals that coordinate control of tractive efforts provided by the first powered vehicle and the second powered vehicle. The second control module is configured to receive second control signals from an energy management module to control the tractive efforts provided by the first powered vehicle and the second powered vehicle based on a trip profile of a trip of the vehicle consist. The monitoring submodule is configured to monitor each of the first control module and the second control module to determine which of the control module and the second control module is controlling the tractive efforts provided by the first powered vehicle and the second powered vehicle. The switching submodule is configured to switch control of the tractive efforts provided by the first powered vehicle and the second powered vehicle between the first control module and the second control module.

BRIEF DESCRIPTION OF THE DRAWINGS

The inventive subject matter described herein will be better understood from reading the following description of the non-limiting embodiments, with reference to the attached drawings, wherein below.

DETAILED DESCRIPTION OF THE INVENTION

Embodiments of the inventive subject matter described herein generally relate to systems and methods for controlling operations of a vehicle consist, such as by controlling tractive efforts of the vehicle consist. The term "tractive effort" can include the force, energy, horsepower, or the like, provided by one or more powered vehicle (e.g., locomotives) in the vehicle consist that propel the vehicle consist. In one embodiment, the term "tractive effort" can include braking effort that is provided by brakes of the vehicles in the vehicle consist. The term "consist" or "vehicle consist" refers to a group of vehicles, such as rail vehicles, that are mechanically coupled or linked together to travel along a route, e.g., on a track that extends along the route of the vehicle consist. While the description herein focuses on rail vehicle consists that include locomotives as powered vehicle of the rail vehicle consist, alternatively, the discussion may apply equally to vehicle consists other than rail vehicle consists and/or to powered vehicles that are capable of self-propulsion other than locomotives.

One or more embodiments of the system and method described herein provide for the control of tractive efforts provided by multiple powered vehicles in a vehicle consist from a first powered vehicle and switching control of the tractive efforts from the first powered vehicle to a different, second powered vehicle in the consist. The ability to switch control of the tractive efforts between the different powered vehicles can enable differently-equipped powered vehicles to be coupled together in a consist (e.g., such as by being mechanically coupled or linked by one or more non-powered vehicles) while providing the different equipment disposed on the powered vehicles to both be used to control the tractive efforts of the consist. As one example, locomotives in a vehicle consist may be equipped with a distributed power (DP) system that permits a lead locomotive having a control module that generates and communicates control signals to other locomotives in the consist. The control signals are received by control modules in the other locomotives and are used to control tractive efforts of the locomotives in the vehicle consist from the lead locomotive. A remote locomotive in the same consist may include an energy management module that generates control signals to control the locomotives in the consist based on a trip profile. The energy management module may generate the control signals based on information related to the consist and/or an upcoming trip of the consist in order to reduce the fuel or other energy that is consumed to propel the vehicle consist. One example of such an energy management module includes the Trip Optimizer™ system provided by General Electric Company. The control signals generated by the energy management module can be communicated from the remote locomotive to other locomotives in the consist (including the lead locomotive) using the DP system to control the tractive efforts of the consist. (As used herein, the term "module" includes a hardware and/or software system that operates to perform one or more functions. For, example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.)

Figure 1:
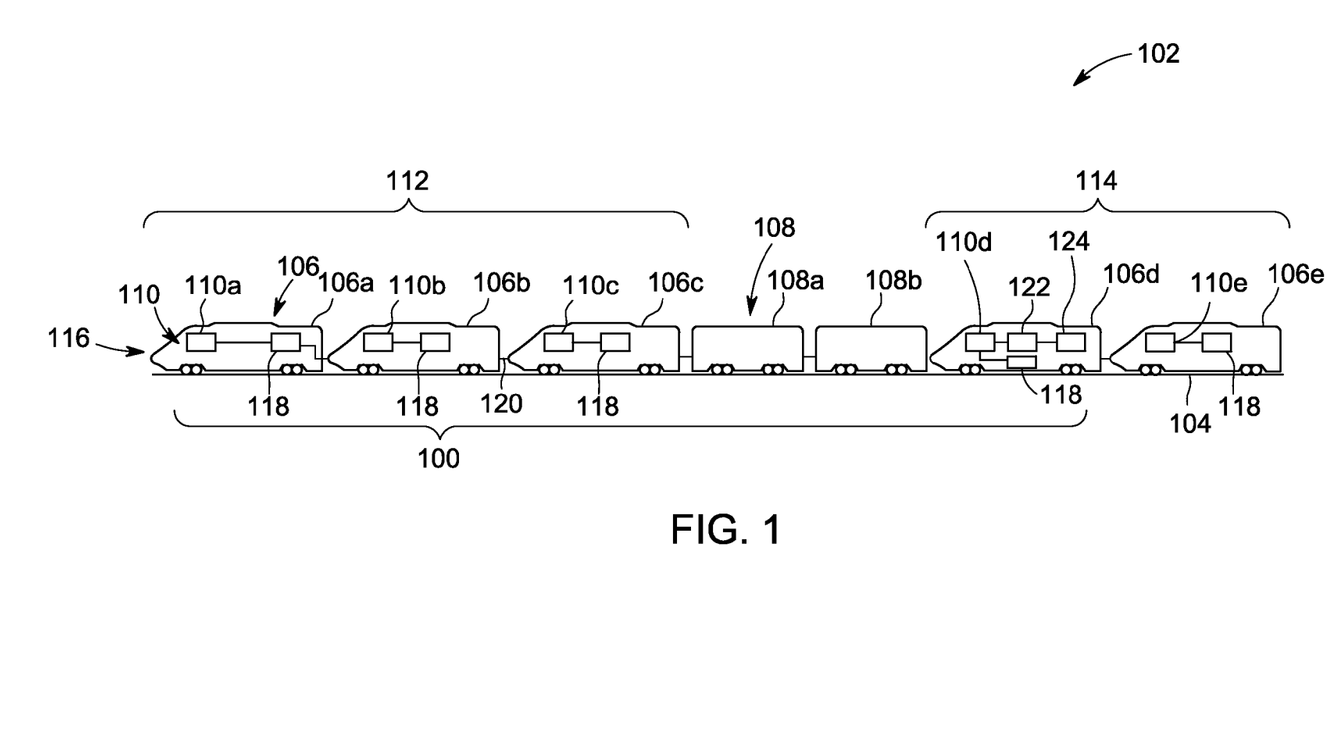
FIG. 1 is a schematic diagram of one embodiment of a system for controlling a vehicle consist.

FIG. 1 is a schematic diagram of one embodiment of a system 100 for controlling a vehicle consist 102. The vehicle consist 102 is illustrated as a rail vehicle consist, but alternatively may be a consist formed from one or more vehicles other than rail vehicles. The vehicle consist 102 includes several powered vehicles 106 mechanically coupled or linked with each other and/or one or more non-powered vehicles 108. The powered vehicles 106 that are directly coupled with each other, such as by being mechanically coupled or linked with each other without a non-powered vehicle 108 disposed between the powered vehicles 106, may be collectively referred to as a motive power group 112, 114. In the illustrated embodiment, the motive power group 112 includes three powered vehicles 106 directly coupled with each other and the motive power group 114 includes two powered vehicles 106 directly coupled with each other. Alternatively, a different number of powered vehicles 106 may be provided in one or more of the motive power groups 112, 114. For example, a single powered vehicle 106 or a greater number of powered vehicles 106 may form the motive power group 112 and/or 114. The vehicle consist 102 may include more than two motive power groups 112, 114, in another embodiment.

The powered vehicles 106 are generally referred to by the reference number 106 and individually referred to by the reference number 106a, 106b, 106c, and so on. The non-powered vehicles 108 are generally referred to by the reference number 108 and individually referred to by the reference number 108a, or 108b. The number of powered vehicles 106 and non-powered vehicles 108 in the illustrated vehicle consist 102 is provided merely as an example, and is not intended to limit all embodiments of the disclosed subject matter.

The powered vehicles 106 include propulsion subsystems 110 that provide tractive effort to propel the powered vehicles 106 and the vehicle consist 102. For example, the powered vehicles 106 may be capable of self-propulsion and, when coupled with one or more other powered vehicles 106 and/or non-powered vehicles 108 in the vehicle consist 102, can propel the vehicle consist 102 along the track 104. In one embodiment, the powered vehicles 106 include locomotives. The propulsion subsystems 110 can include one or more traction motors 206 (shown in FIG. 2), brakes 208 (shown in FIG. 2), engines, and/or other components that rotate wheels and/or axles of the powered vehicles 106 to propel the powered vehicles 106. The propulsion subsystems 110 are generally referred to by the reference number 110 and are individually referred to by the reference numbers 110a, 110b, 110c, and so on.

The non-powered vehicles 108 include vehicles that are not capable of self-propulsion. For example, the non-powered vehicles 108 may include railcars adapted to carry cargo or passengers, and/or that do not include propulsion subsystems 110 that provide tractive effort. In one embodiment, a non-powered vehicle 108 can include a powered vehicle 106 having a malfunctioning propulsion subsystem 110 or a propulsion subsystem 110 that is otherwise unable to generate tractive effort to propel the powered vehicle 106.

The powered vehicles 106 may be arranged in the vehicle consist 102 for operation in a DP system. For example, the powered vehicles 106 may be grouped in the motive power groups 112, 114 with at least two of the powered vehicles 106 (e.g., the powered vehicles 106a and 106d) in the different motive power groups 112, 114 separated from each other by at least one non-powered vehicle 108. In the illustrated embodiment, the motive power groups 112, 114 are separated by two non-powered vehicles 108, but alternatively may be separated by a fewer or greater number of non-powered vehicles 108.

In operation, the powered vehicles 106 in the DP system are positioned at various locations along the length of the vehicle consist 102 such that the tractive effort provided to propel the vehicle consist 102 is supplied by the powered vehicles 106 that are distributed along the length of the vehicle consist 102. By communicating over a wireless link or other communication link, a lead powered vehicle, such as the powered vehicle 106a, coordinates control of the tractive efforts provided by the other powered vehicles 106, which can be referred to as "remote powered vehicles." In the illustrated embodiment, the lead powered vehicle 106a is located at a front end 116 of the vehicle consist 102, such as the end of the vehicle consist 102 that leads the vehicle consist 102 during travel along the track 104. Alternatively, the lead powered vehicle 106 may be disposed in another location in the vehicle consist 102, such as at the location of the powered vehicle 106b or 106c.

The powered vehicles 106 include control modules 118 that control tractive efforts provided in the DP system. The control modules 118 communicate control signals to remotely control tractive efforts provided by other powered vehicles 106. For example, in a first designated operational condition, such as a DP operation, the control module 118 disposed on-board the lead powered vehicle 106a may generate control signals that are communicated to the control modules 118 of other powered vehicles 106 (e.g., remote powered vehicles) in the consist 102. The control modules 118 receive the control signals and use the control signals to control the tractive efforts provided by the remote powered vehicles 106, such as by changing throttle settings and/or brake settings of the remote powered vehicles 106. The control module 118 that controls the tractive efforts in the first designated operational condition (e.g., a DP operation) may be disposed on-board the lead powered vehicle 106a such that the control module 118 is entirely located on the lead powered vehicle 106a and not in another powered vehicle 106 or non-powered vehicle 108, in one embodiment.

In the first designated operational condition, the control module 118 of the lead powered vehicle 106a may direct the tractive efforts provided by the different powered vehicles 106. The control module 118 of the lead powered vehicle 106a may be referred to as the primary control module 118 when the consist 102 operates in the first designated operational condition. The control modules 118 of the other powered vehicles 106 in the consist 102 may be referred to as secondary control modules 118 when the consist 102 operates in the first designated operational condition. The secondary control modules 118 may receive and act on (e.g., obey or be controlled by) the control signals transmitted by the primary control module 118. For example, the primary control module 118 may form and transmit DP control signals to the secondary control modules 118 that direct the secondary control modules 118 to control the propulsion subsystems 110 to provide a designated horsepower, or to operate at a designated throttle setting and/or brake setting. In one embodiment, the primary and secondary control modules 118 are communicatively coupled with the propulsion subsystems 110 of the respective powered vehicles 106 by one or more conductive pathways 120, such as busses, wires, cables, and the like, such as a multiple use (MU) cable bus. The primary control module 118 can transmit the control signals to the secondary control modules 118 through the conductive pathways 120. Alternatively, the control modules 118 may include circuitry (e.g., an antenna, transceiver, and the like) that permit wireless transmission of the control signals from the primary control module 118 to the secondary control modules 118.

In the first designated operational condition, such as a DP operation, the primary control module 118 may coordinate control of the tractive efforts provided by the propulsion subsystems 110 of the different powered vehicles 106 such that the tractive efforts of different powered vehicles 106 are based on each other. For example, the primary control module 118 may generate control signals to change the tractive effort provided by the propulsion subsystem 110d of the powered vehicle 106d based on the location of the powered vehicle 106d in the vehicle consist 102 and/or the tractive efforts provided by one or more other powered vehicles 106. The primary control module 118 may base the tractive efforts provided by the powered vehicles 106 to provide a desired or calculated distribution of the tractive efforts along the length of the vehicle consist 102, to decrease draw bar forces between the adjacent powered vehicles 106 and/or non-powered vehicles 108 below a threshold, and the like. The primary control module 118 may include one or more input devices (e.g., manually actuated switches, levers, buttons, and the like) that enable a human operator to control the tractive efforts provided by the different powered vehicles 106 from the lead powered vehicle 106a. For example, the primary control module 118 may receive manual input from an operator that requests a change in the tractive effort provided by the vehicle consist 102 and, based on the input, coordinate the tractive efforts provided by a plurality of the powered vehicles 106 in order to achieve the requested change in the tractive effort of the vehicle consist 102.

In the illustrated embodiment, at least one of the remote powered vehicles 106 in the vehicle consist 102 includes an energy management module 122. For example, the remote powered vehicle 106d may include the energy management module 122. In a second designated operational condition, the energy management module 122 can generate control signals that are used to control the tractive efforts provided by the propulsion subsystems 110 of the vehicle consist 102 during a trip of the vehicle consist 102. For example, the energy management module 122 may form control signals that are conveyed to the control module 118 in the remote powered vehicle 106. The control signals may be transmitted from the control module 118 in the remote powered vehicle 106 to other powered vehicles 106, such as the lead powered vehicle 106a and one or more other remote powered vehicles 106. The control signals can be received by the control modules 118 disposed on-board these powered vehicles 106 and used to control the tractive efforts of the powered vehicles 106, similar to as described above.

A trip of the vehicle consist 102 includes the travel of the vehicle consist 102 along the track 104 from a starting location to a destination location. The energy management module 122 can refer to a trip profile that includes information related to the vehicle consist 102, the track 106, the geography over which the track 106 extends, and other information in order to control the tractive efforts of one or more of the powered vehicles 106. The energy management module 122 can form control signals to change the tractive efforts of the propulsion subsystems 110 as the vehicle consist 102 travels over different segments of the trip.

For example, if the vehicle consist 102 is approaching a steep incline and the trip profile indicates that the vehicle consist 102 is carrying significantly heavy cargo, then the energy management module 122 may form control signals that direct one or more of the powered vehicles 106 to increase the tractive efforts supplied by the respective propulsion subsystems 110. Conversely, if the vehicle consist 102 is carrying a smaller cargo load based on the trip profile, then the energy management module 122 may form control signals that direct the propulsion subsystems 110 to increase the supplied tractive efforts by a smaller amount than the tractive efforts would otherwise be increased if the data indicated a heavier cargo load. The tractive efforts may be changed in response to other factors, such as changes in the track that the vehicle consist 102 travels along, regulatory requirements (e.g., emission limits) of the regions through which the vehicle consist 102 travels, and the like, and based on the trip profile.

In one embodiment, the energy management module 122 includes a software application such as the Trip Optimizer™ system provided by General Electric Company, to control propulsion operations of the vehicle consist 102 during the trip in order to reduce fuel consumption of the powered vehicles 106 and/or to reduce wear and tear on the vehicle consist 102.

The trip data used to form the trip profile may include mission data (e.g., starting and end points, designated stop points, schedule and other time constraints, and the like), train data, track and other route data, and/or an update to mission data, train data, or track or other route data. Train data includes information about the vehicle consist, cargo being carried by the vehicle consist, and/or information about individual vehicles of the consist. For example, train data may represent cargo content (such as information representative of cargo being transported by the vehicle consist) and/or vehicle information (such as model numbers, manufacturers, horsepower, and the like, of locomotives and/or other railcars in the vehicle consist).

Mission data includes information about an upcoming trip (mission) by the vehicle consist. By way of example only, mission data may include station information (such as the location of a beginning station where the upcoming trip is to begin, intermediate stop points, and/or the location of an ending station where the upcoming trip is to end), restriction information (such as work zone identifications, or information on locations where the track is being repaired or is near another track being repaired and corresponding speed/throttle limitations on the vehicle consist), schedule and other time constraints, and/or operating mode information (such as speed/throttle limitations on the vehicle consist in various locations, slow orders, and the like).

Track and other route data includes information about the track or rails upon which the vehicle consist travels, or otherwise about the route of the vehicle consist. For example, the track data can include information about locations of damaged sections of a track, locations of track sections that are under repair or construction, the curvature and/or grade of a track, Global Position System (GPS) coordinates of the track, and the like. The track data is related to operations of the vehicle consist as the track data includes information about the track that the vehicle consist is or will be traveling on. However, other types of data can be recorded as the data and/or the data may be used for other operations. The term "data" may refer to mission data, train data, and track data, only one of mission data, train data, or track data, or another type of data.

The energy management module 122 may generate the control signals that are used to control tractive efforts and/or braking efforts of the consist 102 based on a position of the remote powered vehicle 106 in which the energy management module 122 is disposed relative to the lead powered vehicle 106a. For example, the energy management module 122 may receive location data, such as GPS coordinates of the remote vehicle 106 having the energy management module 122 and received from a GPS receiver in the remote powered vehicle 106, and base control of the tractive efforts and/or braking efforts of the powered vehicles in the consist on the distance between the remote powered vehicle 106 and the lead powered vehicle 106a. The distance between the remote powered vehicle 106 and the lead powered vehicle 106a may be used to determine when to change the tractive efforts provided by the lead powered vehicle 106 and/or one or more other remote powered vehicles 106 between the lead powered vehicle 106 and the remote powered vehicle 106 having the energy management module 122. For example, if the lead powered vehicle 106 (or other vehicle of the consist 102 at the front end of the consist 102) is approaching an incline or decline, the energy management module 122 on the remote powered vehicle 106 may determine when to increase or decrease the tractive efforts of one or more powered vehicles 106 in the consist 102 based on when the lead powered vehicle 106 reaches the incline or decline, respectively. As another example, a trip profile may prohibit the consist 102 from traveling beyond a geographic location along the track (e.g., the location of a switch). The energy management module 122 may use the distance between the remote powered vehicle 106 that includes the energy management module 122 and the lead powered vehicle 106 to determine when to instruct the powered vehicles 106 in the consist 102 to stop or slow down so that the lead powered unit 106 (or other vehicle at the front end of the consist 102) does not travel beyond the geographic location.

The determination of when to change the tractive efforts and/or braking efforts may be based on a consist distance between the remote powered vehicle 106 having the energy management module 122 and the lead powered vehicle 106. The term "consist distance" refers to the distance between the remote powered vehicle 106 that has the energy management module 122 and the lead powered vehicle 106 (or another vehicle of the consist 102 at the front or leading end of the consist 102) as measured along the length of the consist 102. As the contour of the consist 102 may change due to curves in the track, the consist distance may be shorter than the linear distance in Euclidean space between the remote powered vehicle 106 and the lead powered vehicle 106. For example, when the consist 102 has a curved shape, such as when travelling along a curved section of a track, the consist distance between the remote powered vehicle 106 and the lead powered vehicle 106 may be larger than the linear distance measured in Euclidean space between the remote powered vehicle 106 and the lead powered vehicle 106. The energy management module 122 may use the consist distance to avoid causing the lead powered vehicle 106 (or other vehicle at the front end of the consist 102) from traveling beyond a geographic location as dictated by the trip profile.

In one embodiment, the energy management module 122 is entirely disposed on a powered vehicle 106 other than the lead powered vehicle 106a. For example, the energy management module 122 may be entirely disposed on the remote powered vehicle 106d. Alternatively, the energy management module 122 may be disposed on another powered vehicle 106 other than the lead powered vehicle 106a. In the illustrated embodiment, the lead powered vehicle 106a does not include the energy management module 122 or any other energy management module or component that controls tractive efforts of the powered vehicles 106 based on a trip profile.

In the second designated operational condition, control of the tractive efforts provided by the consist 102 may be transferred from the control module 118 disposed on-board a first powered vehicle 106 (e.g., the lead powered vehicle 106a) to the control module 118 disposed on-board a second powered vehicle 106 (e.g., a remote powered vehicle 106). This transfer may result in the control module 118 in the first powered vehicle 106 changing from being a primary control module 118 to a secondary control module 118 and the secondary control module 118 in the second powered vehicle 106 changing to the primary control module 118 of the consist 102. As described above, the primary control module 118 of the second powered vehicle 106 may control the tractive efforts provided by the powered vehicles 106 in the consist 102. In one embodiment, the primary control module 118 of the second powered vehicle 106 controls the tractive efforts of the powered vehicles 106 by transmitting the control signals formed by the energy management module 122 to the secondary control modules 118. The consist 102 may be configured such that only one primary control module 118 may transmit control signals to control the tractive efforts provided by the powered vehicles 106.

In one embodiment, the energy management module 122 may generate and transmit the control signals used to control the tractive efforts of the consist 102. For example, instead of the energy management module 122 generating the control signals and conveying the control signals to the control module 118 for transmission to the control modules 118 of the powered vehicles 106 in the consist 102, the energy management module 122 may generate and transmit the control signals to the control modules 118 of the other powered vehicles 106 in the consist 102.

The primary control module 118 that is disposed on a remote powered vehicle 106 may automatically control the tractive efforts of the powered vehicles 106 in the second designated operational condition by wirelessly transmitting control data to the secondary control modules 118 of the other powered vehicles 106. For example, the energy management module 122 may be coupled with the primary control module 118 having circuitry (e.g., an antenna, transceiver, and the like) that wirelessly transmits control signals to the secondary control modules 118 disposed on-board other powered vehicles 106. The secondary control modules 118 may receive the control signals and direct the corresponding propulsion subsystems 110 to change the associated throttle settings and/or brake settings to achieve the tractive efforts directed by the control signals. Alternatively, the energy management module 122 may generate the control signals that are transmitted by the primary control module 118 to the secondary control modules 118 through one or more conductive pathways, such as the conductive pathway 120.

In one embodiment, only one of the control modules 118 (e.g., the primary control module 118) can control the tractive efforts provided by the powered vehicles 106 of the consist 102 at a time. For example, in the first designated operational condition, only the control module 118 disposed on-board the lead powered vehicle 106a can control the tractive efforts of the consist 102 and none of the control modules 118 disposed on-board the remote powered vehicles 106 may concurrently or simultaneously control the tractive efforts provided by the powered vehicles 106 in the consist 102. In the second designated operational condition, control of the tractive efforts may switch from the control module 118 in the lead powered vehicle 106a to the control module 118 in one of the remote powered vehicles 106. The time periods that the different control modules 118 control the tractive efforts of the powered vehicles 106 in the first or second designated operational conditions may be non-overlapping time periods.

In order to prevent two or more control modules 118 from concurrently or simultaneously transmitting control signals to control the tractive efforts provided by the powered vehicles 106, a control arbitration module 124 may determine which of the control modules 118 is the primary control module 118 (that transmits the control signals) and which are the secondary control modules 118 (that receives and acts on the control signals). The control arbitration module 124 is communicatively coupled with the control modules 118. In the illustrated embodiment, the control arbitration module 124 is disposed on-board the remote powered vehicle 106d. Alternatively, the control arbitration module 124 may be disposed on another powered vehicle 106 and/or a non-powered vehicle 108, or its function may be distributed across plural vehicles. The control arbitration module 124 can be communicatively coupled with the control modules 118 by one or more wired and/or wireless communication links, such as the conductive pathway 120, a wireless network, or the like.

Depending on the operational condition of the consist 102, the control arbitration module 124 selects one of the control modules 118 to generate the control signals used to control the propulsion subsystems 110 of the vehicle consist 102. The control arbitration module 124 can transmit a command signal to one or more of the control modules 118 to direct which one of the control modules 118 is to be the primary control module 118 and which of the control modules 118 is or are to be secondary control modules 118. In one embodiment, the control arbitration module 124 directs the primary control module 118 to transmit a control indicator with the control signals to the secondary control modules 122. The control indicator represents which of the control modules 118 is the primary control module 118 and that currently generates the control signals used to control the tractive efforts provided by the propulsion subsystems 110. The secondary control modules 118 may continue to transmit control signals, but without the control indicator. The control modules 118 that receive the control signals with the control indicator act on or obey the control signals but may ignore or reject control signals that are transmitted without the control indicator.

Alternatively, the propulsion subsystems 110 may receive and act on the control signals transmitted by a designated preferred one of the control modules 118, while ignoring or rejecting the control signals transmitted by other control modules 118. For example, if the control module 118 on a remote powered vehicle 106 is designated as preferred, when the control module 118 on the remote powered vehicle 106 and another control module 118 concurrently or simultaneously transmit control signals, the control modules 118 of the consist 102 may only operate based on the control signals from the designated preferred control module 118.

The control modules 118 may be associated with respective identifiers, such as a unique address or identification (ID), that are transmitted with the control signals. The secondary control modules 118 may use the identifiers associated with the received control signals to determine the source of the control signals. For example, a secondary control module 118 may determine if received control signals are transmitted from the primary control module 118, or from another secondary control module 118.

One or more switching events may cause the control arbitration module 124 to switch the consist 102 between the first designated operational condition and the second designated operational condition. For example, in the second designated operational condition when the control module 118 on a remote powered vehicle 106 is the primary control module 118 that controls the tractive efforts of the consist 102 based on control signals from the energy management module 122, the control arbitration module 124 may switch from the second designated operational condition to the first designated operational condition when the control arbitration module 124 identifies or detects that a human operator in one or more of the powered vehicles 106, such as the lead powered vehicle 106*a*, manually changes a throttle setting and/or a brake setting of the powered vehicle 106. As a result, the control module 118 on the lead powered vehicle 106*a* may become the primary control module 118 that controls the tractive efforts of the consist 102 and the control module 118 that was the primary control module 118 becomes a secondary control module 118. As a result, an operator may regain control of the propulsion subsystems 110 in a DP operation that is controlled from the lead powered unit 106*a* by manually changing one or more settings of the propulsion subsystem 110*a* of the lead powered vehicle 106*a*. Other switching events that may cause the control arbitration module 124 to switch control between the modules 118 may include a malfunction by one or more of the modules 118, 122 and/or propulsion subsystems 110, a loss of communication between one of the modules 118, 112 and the control arbitration module 124 or the propulsion subsystems 110, a change in throttle settings and/or brake settings that is directed by the control module 118 or the energy management module 122 that exceeds one or more predetermined thresholds, and the like. In one embodiment, data that is transmitted from a source disposed off-board the vehicle consist 102, such as a portable or hand-held operator control unit, a railroad dispatch center, and the like, may direct the control of the tractive efforts to be switched between the control modules 118.

Figure 2:
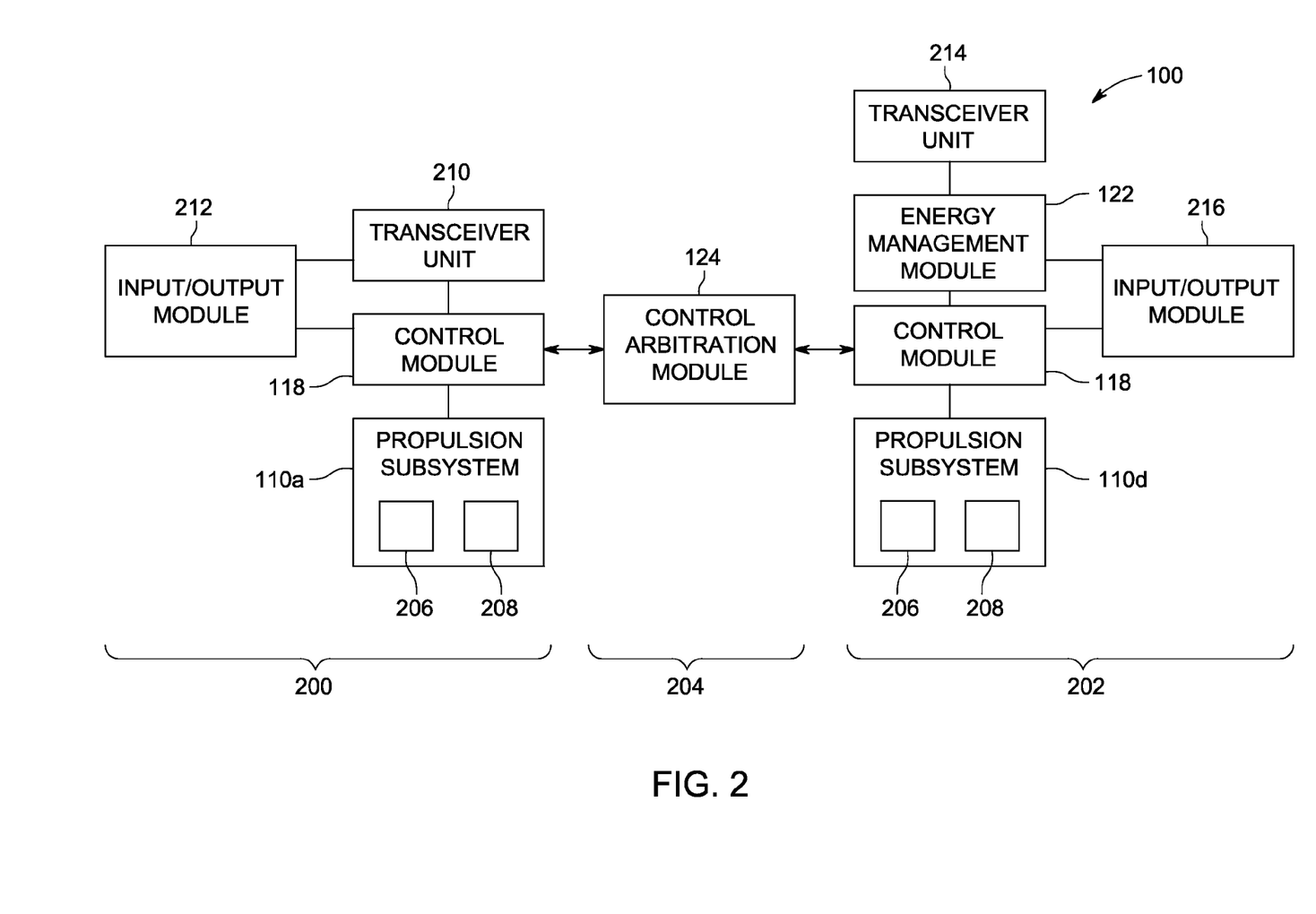
FIG. 2 is a schematic diagram of the system shown in FIG. 1 in accordance with one embodiment.

FIG. 2 is a schematic diagram of the system 100 shown in FIG. 1 in accordance with one embodiment. In the illustrated embodiment, the components of the system 100 are grouped into several units, including a lead control unit 200, a remote control unit 202, and an arbitration unit 204. The lead control unit 200 may control the tractive efforts of the propulsion subsystems 110 in the vehicle consist 102 in the first designated operational condition (e.g., according to a DP operation where the lead powered vehicle 106*a* coordinates control of the tractive efforts) and the remote control unit 202 controls the tractive efforts of the propulsion subsystems 110 in the vehicle consist 102 from a different, second vehicle (e.g., the remote powered vehicle 106*d* shown in FIG. 1) according to a trip profile when the consist 102 is in the second designated operational condition. The lead control unit 200 and the remote control unit 202 may be separately disposed on different vehicles, such as the lead powered vehicle 106*a* and the remote powered vehicle 106*d*, while being separated from at least another vehicle (e.g., a third vehicle), such as a non-powered vehicle 108*a* and/or 108*b* (shown in FIG. 1).

The arbitration unit 204 dictates which of the lead control unit 200 and the remote control unit 202 controls the tractive efforts provided by the propulsion systems 110 of the powered vehicles 106 (shown in FIG. 1) in the vehicle consist 102. For example, the arbitration unit 204 may include the control arbitration module 124 that determines which of the control modules 118 is the primary control module 118. In the embodiment shown in FIG. 1, the control arbitration module 124 (and the arbitration unit 204) is entirely disposed on-board the remote powered vehicle 106*d* (shown in FIG. 1). For example, the processing hardware and/or the software that provides the control arbitration module 124 may be located on the lead powered vehicle 106*a*. The control arbitration module 124 may remotely monitor the propulsion subsystem 110*a* of the lead powered vehicle 106*a* by one or more wired and/or wireless communication links that extend between the remote powered vehicle 106*d* and the propulsion subsystem 110*a* of the lead powered vehicle 106*a*. The control arbitration module 124 can monitor the propulsion subsystem 110*a* to determine when an operator manually changes one or more throttle settings or brake settings of the lead powered vehicle 106*a*. When such a change is detected by the control arbitration module 124, the control arbitration module 124 can switch control of the propulsion subsystems 110 in the vehicle consist 102 (shown in FIG. 1) between the control modules 118, as described above. For example, if the primary control module 118 is the control module 118 in the remote control unit 202, then the control arbitration module 124 may transfer control of the vehicle consist 102 from the control module 118 in the remote control unit 202 to the control module 118 in the lead control unit 200.

Alternatively, the control arbitration module 124 (and the arbitration unit 204) may be entirely disposed on-board the lead powered vehicle 106*a*. For example, the processing hardware and/or the software that provides the control arbitration module 124 may be located on the lead powered vehicle 106*a*. In such an embodiment, the control arbitration module 124 may monitor the propulsion subsystem 110*a* of the lead powered vehicle 106*a* by one or more wired and/or wireless communication links on-board the lead powered vehicle 106*a* to determine when an operator manually changes one or more throttle settings or brake settings of the lead powered vehicle 106*a*. When such a change is detected by the control arbitration module 124, the control arbitration module 124 can switch control of the propulsion subsystems 110 in the vehicle consist 102 (shown in FIG. 1) between the control modules 118, as described above.

In another embodiment, the control arbitration module 124 (and the arbitration unit 204) may be disposed on two or more of the powered vehicles 106 (shown in FIG. 1) and/or the non-powered vehicles 108 (shown in FIG. 1). For example, one or more components of the processing hardware and/or the software that provides the control arbitration module 124 may be located on the lead powered vehicle 106a while other components of the processing hardware and/or the software that provides the control arbitration module 124 may be located on the remote powered vehicle 106d. Alternatively, one or more components of the processing hardware and/or the software of the control arbitration module 124 may be disposed on another vehicle, such as another powered vehicle 106 and/or another non-powered vehicle 108.

The lead control unit 200 includes the control module 118 operably coupled with the propulsion subsystem 110a of the lead powered vehicle 106a (shown in FIG. 1). As used herein, the terms "operably coupled" and "operatively coupled" include connecting one component with another component by one or more mechanical, wired, and/or wireless connections. For example, the control module 118 may be connected with the propulsion subsystem 110a by one or more wired and/or wireless connections. The control module 118 may form and communicate control signals to the propulsion subsystem 110a that instructs the propulsion subsystem 110a to change throttle settings and/or brake settings of the propulsion subsystem 110a.

The control modules 118 may be operably coupled with a transceiver unit 210. The transceiver unit 210 is a device that enables wired and/or wireless communication between the control modules 118 and one or more other components. In one embodiment, the transceiver unit 210 may communicate data with the control arbitration module 124 through one or more wired connections (e.g., the conductive pathway 120 shown in FIG. 1) and/or wireless connections (e.g., a wireless network). For example, if the lead control unit 200 and the arbitration module 124 are disposed on different vehicles 106, 108 (shown in FIG. 1), then the transceiver unit 210 can communicate data between the control module 118 and the control arbitration module 124. The transceiver unit 210 can transmit the control signals formed by the control module 118 that is used to remotely control the propulsion subsystems 110 of the powered vehicles 106 of the vehicle consist 102. For example, the powered vehicles 106 may include similar transceiver units that receive the control signals from the transceiver unit 210 of the lead control unit 200 and convey the control signals to the propulsion subsystems 110 of the powered vehicles 106. The propulsion subsystems 110 use the control signals from the control module 118 to set or change the tractive efforts provided by the propulsion subsystems 110. In another example, the transceiver unit 210 can transmit data representative of detection by the control module 118 that an operator has changed a throttle setting and/or a brake setting of the propulsion subsystem 110a. If the control module 118 of the remote control unit 202 is controlling the propulsion subsystems 110 of the vehicle consist 102, the control arbitration module 124 may receive the data representative of such a detection and switch control of the propulsion subsystems 110 from the control module 118 of the remote control unit 202 to the control module 118 of the lead control unit 200, as described above.

The control module 118 of the lead control unit 200 may be operably coupled with an input/output module 212. In one embodiment, the control module 118 of the remote control unit 202 may be operably coupled with an input/output module 212 The input/output module 212 includes one or more components that receive input from an operator of the lead control unit 200 (e.g., a human operator disposed on-board the lead powered vehicle 106a shown in FIG. 1). For example, the input/output module 212 may include one or more buttons, switches, levers, touch screens, microphones, and the like, that receive input from the operator. The operator may use the input/output module 212 to provide input that is used to control operations of the propulsion subsystem 110a of the lead control unit 200. When the vehicle consist 102 (shown in FIG. 1) is running in a DP operation, the input/output module 212 may receive input from the operator that controls the tractive efforts of the propulsion subsystems 110 of the vehicle consist 102. For example, the input/output module 212 may receive input that remotely controls the propulsion subsystems 110 of the powered vehicles 106. The input/output module 212 can include one or more components that provide output to the operator, such as a display device, monitor, screen, printer, audible alarm, visual alarm, or the like.

The remote control unit 202 includes the energy management module 122 operably coupled with the propulsion subsystem 110d of the remote powered vehicle 106d (shown in FIG. 1) and with the control module 118 of the remote control unit 202. The energy management module 122 may form and communicate control signals to the control module 118 of the remote control unit 202 that instructs the propulsion subsystem 110d to change throttle settings and/or brake settings of the propulsion subsystem 110d based on a trip profile, as described above. The control module 118 of the remote control unit 202 is operably coupled with a transceiver unit 214. The transceiver unit 214 may be similar to the transceiver unit 210. For example, the transceiver unit 214 may communicate data between the control module 118 and one or more other components. In one embodiment, the transceiver unit 214 can transmit the control signals formed by the energy management module 122 that is used to remotely control the propulsion subsystems 110 of the powered vehicles 106 of the vehicle consist 102 based on a trip profile. The powered vehicles 106 may include similar transceiver units that receive the control signals from the transceiver unit 214 of the remote control unit 202 and convey the control signals to the control modules 118 disposed on the powered vehicles 106. The control modules 118 use the control data generated by the energy management module 122 to set or change the tractive efforts provided by the propulsion subsystems 110.

The control module 118 of the remote control unit 202 is operably coupled with an input/output module 216. The input/output module 216 may be similar to the input/output module 212. For example, the input/output module 216 may include one or more components that receive input from an operator disposed on-board the remote powered vehicle 106d shown in FIG. 1. The input/output module 216 can include one or more components that provide output to the operator, such as a display device, monitor, screen, printer, audible alarm, visual alarm, or the like.

Figure 3:
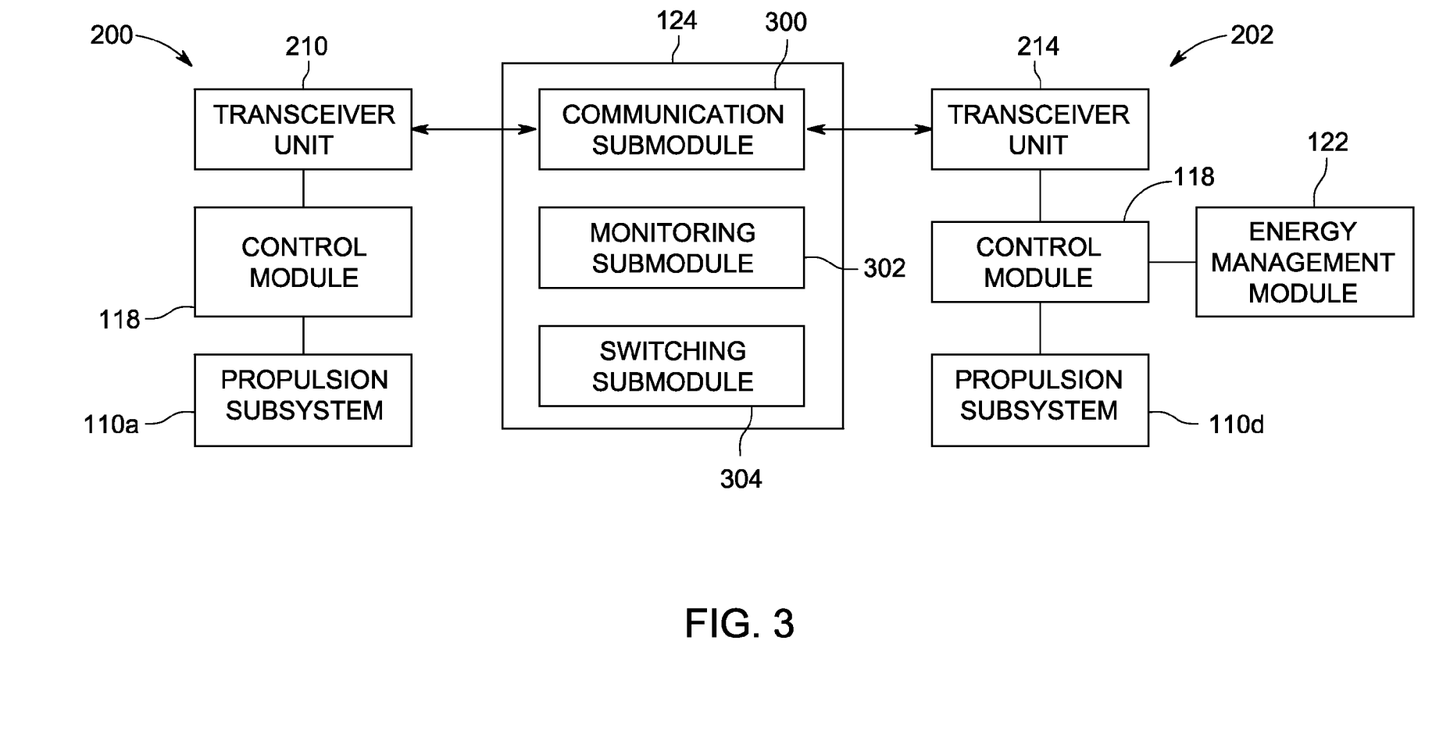
FIG. 3 is a schematic diagram of one embodiment of a control arbitration module shown in FIG. 1.

FIG. 3 is a schematic diagram of one embodiment of the control arbitration module 124. The control arbitration module 124 includes several submodules that perform one or more operations described herein. One or more of the submodules may be embodied in hardware and/or software systems that operate to perform one or more functions. For example, a submodule may include a computer processor, controller, or other logic-based device, or a portion thereof, that performs operations based on instructions stored on a tangible and non-transitory computer readable storage medium, such as a computer memory. Alternatively or additionally, a submodule may include a hard-wired device, or a portion thereof, that performs operations based on hard-wired logic of the device. The submodules shown in the attached figures may represent the hardware that operates based on software or hardwired instructions, the software that directs hardware to perform the operations, or a combination thereof.

In the illustrated embodiment, the control arbitration module 124 includes a communication submodule 300 that communicates with the transceiver units 210, 214 of the lead control unit 200 and the remote control unit 202. The communication submodule 300 may be connected with the transceiver units 210, 214 by one or more wired and/or wireless connections. For example, the communication submodule 300 may communicate data with the transceiver units 210 through the conductive pathway 120 (shown in FIG. 1) and/or a wireless network. The communication submodule 300 may communicate data to the control modules 118 that directs which of the control modules 118 is the primary control module 118 that form and transmit control signals used to control the tractive efforts provided by the propulsion subsystems 110 of the vehicle consist 102, and which of the control modules 118 are secondary control modules 118 that receive and implement control signals from the primary control module 118.

The communication submodule 300 may include one or more components that communicate data with the transceiver units 210, 214. For example, the communication submodule 300 may include a transceiver unit that is similar to the transceiver unit 210 or 214. In one embodiment, the communication submodule 300 shown in FIG. 3 represents a transceiver unit that is similar to the transceiver unit 210 or 214.

The control arbitration module 124 includes a monitoring submodule 302 that monitors at least one of the lead control unit 200 and/or the remote control unit 202. The monitoring submodule 302 can monitor the lead control unit 200 and/or the remote control unit 202 to determine which of the control modules 118 is currently the primary control module 118 controlling the tractive efforts provided by the propulsion subsystems 110 (shown in FIG. 1). For example, if the control module 118 of the remote control unit 202 is receiving control signals from the energy management module 122 that are based on a trip profile and is transmitting the control signals to the powered vehicles 106 (shown in FIG. 1) to control the tractive efforts of the powered vehicles 106, then the monitoring submodule 302 may determine that the control module 118 of the remote control unit 202 is the primary control module 118 that currently is controlling the tractive efforts of the vehicle consist 102.

Alternatively, the monitoring submodule 302 may examine the control signals transmitted by the lead control unit 200 and/or the remote control unit 202 to determine if the control signals include a control indicator that indicates that the lead control unit 200 or remote control unit 202 is controlling the tractive efforts provided by the powered vehicles 106 of the vehicle consist 102. For example, the monitoring submodule 302 may determine which of the control modules 118 is transmitting control signals that include the control indicator.

In one embodiment, the monitoring submodule 302 can monitor the lead control unit 200 to determine if an operator has manually changed a throttle setting and/or brake setting of the propulsion subsystem 110a of the lead powered unit 106a (shown in FIG. 1). As described above, when the remote control unit 202 is controlling the tractive efforts provided by the vehicle consist 102 (shown in FIG. 1) and an operator in the lead powered vehicle 106a changes a setting of the propulsion subsystem 110a, the control arbitration module 124 may switch control of the propulsion subsystems 110 from the remote control unit 202 back to the lead control unit 200. The monitoring submodule 302 can monitor the lead control unit 200 for such a manual change by periodically determining if the lead control unit 200 has transmitted data to the control arbitration module 124 that indicates an operator manually changed the throttle setting and/or brake setting of the propulsion subsystem 110a. For example, the control module 118 may determine when the operator changes the throttle setting and/or brake setting of the propulsion subsystem 110a. The control module 118 may form data representative of the change and direct the transceiver unit 210 to communicate the data to the communication submodule 300. The communication submodule 300 may convey the data to the monitoring submodule 302 so that the monitoring submodule 302 determines that the operator has changed the throttle setting and/or brake setting.

The control arbitration module 124 includes a switching submodule 304 that switches control of the tractive efforts provided by the propulsion subsystems 110 (shown in FIG. 1) of the vehicle consist 102 (shown in FIG. 1) between the lead control unit 200 and the remote control unit 202. For example, the switching submodule 304 may determine when to switch between the first designated operational condition (where control of the propulsion subsystems 110 originates from the primary control module 118 disposed on the lead powered vehicle 106a) to the second designated operational condition (where control of the propulsion subsystems 110 originates from control signals generated by the energy management module 122 and transmitted by the primary control module 118 on a remote powered vehicle 106). In one embodiment, the switching submodule 304 may switch from the first designated operational condition to the second designated operational condition after the control module 118 of the lead powered vehicle 106a has been the primary control module 118 for a predetermined period of time without an operator manually changing a throttle setting and/or a brake setting of the propulsion subsystem 110a. Alternatively, the switching submodule 304 may switch from the first designated operational condition to the second designated operational condition after receiving input from an operator directing the switch the operational conditions.

Figure 4:
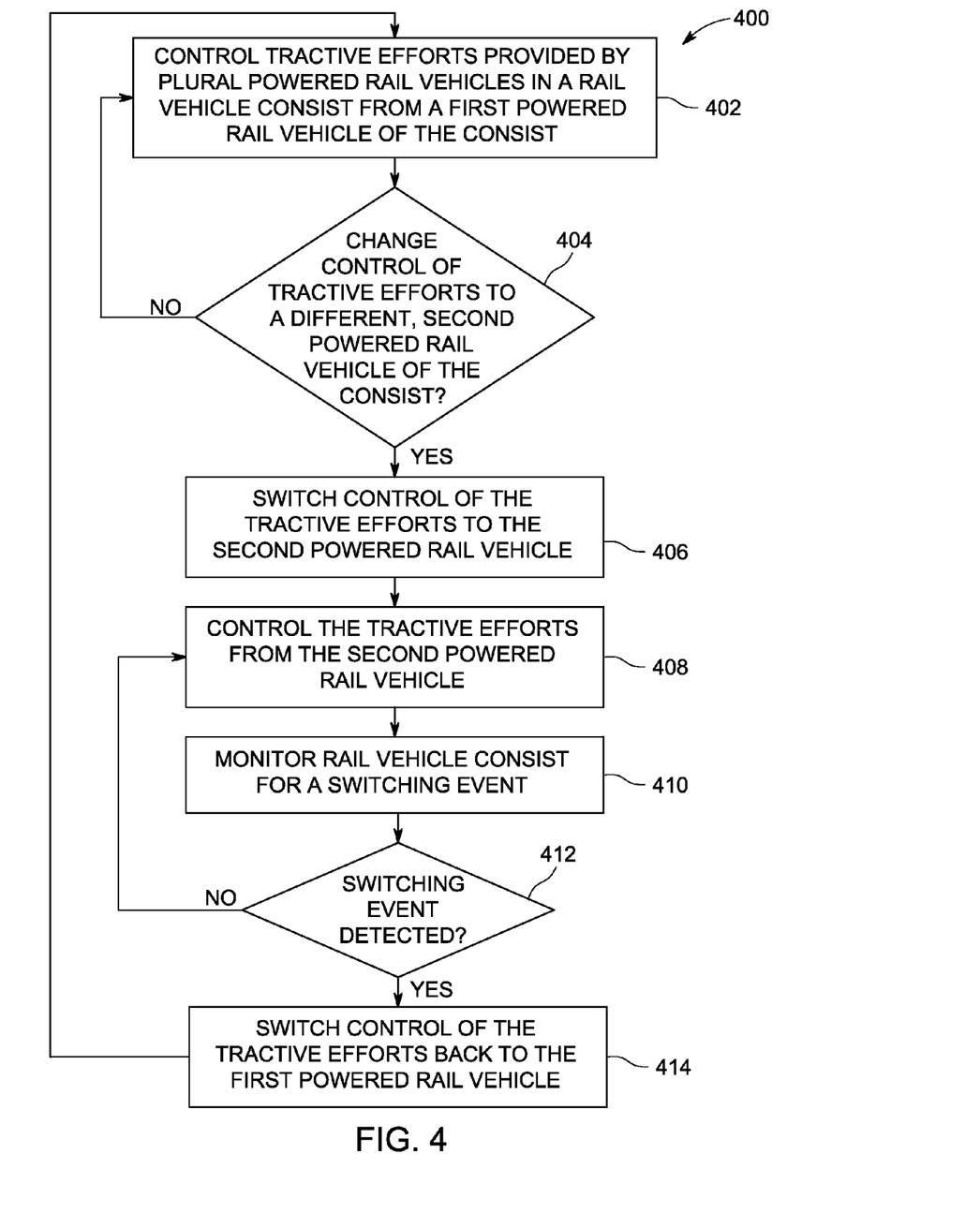
FIG. 4 is a flowchart of one embodiment of a method for controlling a vehicle consist.

FIG. 4 is a flowchart of one embodiment of a method 400 for controlling a vehicle consist. The method 400 may be used to remotely control the tractive efforts provided by propulsion subsystems with different modules disposed on different powered vehicles of a vehicle consist. For example, one or more embodiments of the method 400 may be used to control which of the control modules 118 (shown in FIG. 1) controls the tractive efforts provided by the propulsion subsystems 110 (shown in FIG. 1) of multiple or all of the powered vehicles 106 (shown in FIG. 1) of the vehicle consist 102 (shown in FIG. 1). In one embodiment, the method 400 may be used to switch control of the tractive efforts between the control module 118 on the lead powered vehicle 106a in a DP operation and the control module 118 on a remote powered vehicle 106 that receives control signals from the energy management module 122.

At 402, the tractive efforts provided by plural powered vehicles of a vehicle consist 102 are controlled from the control module 118 on a first powered vehicle of the consist. For example, a module (e.g., the control module 118 shown in FIG. 1) disposed on-board the lead powered vehicle 106a (shown in FIG. 1) may remotely control the tractive efforts provided by the propulsion subsystems 110 (shown in FIG. 1) of the powered vehicles 106 of the vehicle consist 102. As described above, the module on the first powered vehicle may control the tractive efforts in a DP operation. For example, the control module 118 of the lead powered vehicle 106a may form control signals that are transmitted to the propulsion subsystems 110 of the vehicle consist 102. The control signals may coordinate the tractive efforts provided by the propulsion subsystems 110 such that the tractive effort provided by a first propulsion subsystem 110 of a first powered vehicle 106 in the vehicle consist 102 is based on (e.g., corresponds to, changes in a linear or non-linear relationship with respect to, or otherwise depends on) the tractive effort or changes in the tractive effort provided by one or more propulsion subsystems 110 of powered vehicles 106 other than the first powered vehicle 106.

At 404, a determination is made at to whether control of the tractive efforts of the vehicle consist is to be switched to a module disposed on-board a different, second powered vehicle of the consist. In one embodiment, the first powered vehicle and the second powered vehicles are mechanically linked or coupled with each other and separated from each other by at least a third vehicle, which may be a non-powered vehicle (e.g., a vehicle that is incapable of self-propulsion). For example, a determination may be made as to whether control of the propulsion subsystems 110 (shown in FIG. 1) of multiple or all of the powered vehicles 106 (shown in FIG. 1) of the vehicle consist 102 (shown in FIG. 1) should be switched from the control module 118 (shown in FIG. 1) on the lead powered vehicle 106a to the control module 118 on a remote powered vehicle 106. The control module 118 on the remote powered vehicle 106 may receive control signals from the energy management module 122.

The determination may be automatically or manually made. For example, in one embodiment, a decision to switch control of the tractive efforts from the module on the first powered vehicle to the module on the second powered vehicle may be automatically made when the module on the first powered vehicle has controlled the tractive efforts for at least a predetermined time period or at least a predetermined distance from a starting location of the vehicle consist. Alternatively, the determination may be made when the vehicle consist enters or leaves a predetermined geographic area or geofence. In another embodiment, the determination to switch control of the tractive efforts may be automatically made based on one or more other factors, conditions, or states of the vehicle consist. In one embodiment, the switch of control of the tractive efforts is manually made when a human operator manually directs the modules to switch control, such as by actuating a button, switch, touchscreen, lever, or the like, disposed on-board the first powered vehicle. Alternatively, the manual switch of control may occur when data transmitted from a source disposed off-board the vehicle consist (e.g., from a dispatch center, operator control unit, or the like) directs the modules to switch control of the tractive efforts between the first powered vehicle and the second powered vehicle.

If there is no determination to switch control of the tractive efforts from the module on the first powered vehicle to the second powered vehicle, then the module disposed on-board the first powered vehicle may continue to control the tractive efforts provided by the powered vehicles of the consist. As a result, flow of the method 400 returns to 402. On the other hand, if there is a determination to switch control of the tractive efforts from the module on the first powered vehicle to the second powered vehicle, then flow of the method 400 continues to 406.

At 406, the module disposed on-board the first powered vehicle stops controlling the tractive efforts provided by the powered vehicles of the consist. Control of the tractive efforts may be switched to the module disposed on-board the second powered vehicle. As described above, when the module on the second powered vehicle is in control of the tractive efforts provided by the powered vehicles of the consist, the module disposed on-board the first powered vehicle may refrain from controlling the tractive efforts.

At 408, the module disposed on the second powered vehicle of the consist controls the tractive efforts provided by multiple or all of the powered vehicles in the consist. In one embodiment, the module in the second powered vehicle may receive control signals formed by the energy management module 122 (shown in FIG. 1) based on a trip profile. The trip profile includes data related to the vehicle consist, the track along which the consist is traveling, and/or other data. The energy management module 122 can use the trip profile to calculate or otherwise determine different throttle settings and/or brake settings for different powered vehicles in the consist in order to more efficiently travel (e.g., reduce fuel consumption without significantly adding to delays in travel) along a trip.

In accordance with one embodiment, at 410, the vehicle consist is monitored for a switching event. As described above, a switching event can include an incident or occurrence that causes control of the powered vehicles to switch from the module on the second powered vehicle back to the module on the first powered vehicle. For example, control of the propulsion subsystems 110 (shown in FIG. 1) may be switched from the control module 118 (shown in FIG. 1) on the remote powered vehicle 106 (shown in FIG. 1) that receives control signals from the energy management module 122 (shown in FIG. 1) to the control module 118 disposed on the lead powered vehicle 106a. The switching event may include detection of a human operator manually changing a throttle setting and/or a brake setting of a powered vehicle in the consist, a malfunction by one or more of the modules and/or powered vehicles, a loss of communication between the modules and/or between the modules and the propulsion subsystems, a change in throttle settings and/or brake settings that is directed by the modules that exceeds one or more predetermined thresholds, receipt of data that is transmitted from a source disposed off-board the vehicle consist that directs the switch take place, or the like.

At 412, a determination is made as to whether a switching event is detected. For example, one or more of the modules disposed on-board the vehicle consist may determine if a human operator has manually changed a throttle setting and/or a brake setting, if any of the modules or powered vehicles have malfunctioned, if there is a loss of communication between the modules and/or between the modules and the powered vehicles, if an unexpected change in a throttle setting and/or brake setting is directed by either module, if instructions are received from off-board the consist to switch control, and the like. If no switching event is detected, then flow of the method 400 returns to 408, where the module disposed on-board the second powered vehicle continues to control the tractive efforts of the consist. On the other hand, if a switching event is detected, then flow of the method 400 proceeds to 414.

At 414, control of the tractive efforts provided by the powered vehicles of the vehicle consist is switched from the module disposed on-board the second powered vehicle to the module disposed on-board the first powered vehicle. For example, control over the propulsion subsystems 110 (shown in FIG. 1) in the consist 102 (shown in FIG. 1) may be transferred from the control module 118 (shown in FIG. 1) that receives and transmits the control signals formed by the energy management module 122 (shown in FIG. 1) back to the control module 118 disposed on the lead powered vehicle 106a (shown in FIG. 1). When control over the tractive efforts is switched back to the module on the first powered vehicle, flow of the method 400 may return to 402, where the module on the first powered vehicle continues to control the tractive efforts provided by the powered vehicles.

In one embodiment, a system includes first and second control modules, an energy management module, and a control arbitration module. The first and second control modules are configured to be disposed on-board first and second powered vehicles that are mechanically coupled with each other by at least a third vehicle in a vehicle consist. The first control module is configured to form control signals to coordinate tractive efforts provided by the vehicle consist. The energy management module is configured to be disposed on-board the second powered vehicle and is configured to be communicatively coupled with the second control module. The energy management module is configured to form control signals that are transmitted by the second control module to control the tractive efforts provided by the first powered vehicle and the second powered vehicle based on a trip profile associated with a trip of the vehicle consist. The control arbitration module is configured to be communicatively coupled with the first and second control modules. The control arbitration module is configured to determine which of the first and second control modules controls the tractive efforts provided by the vehicle consist.

In another aspect, the first powered vehicle is a lead vehicle and the second powered vehicle is a remote vehicle in a distributed power operation of the vehicle consist.

In another aspect, the third vehicle is a non-powered vehicle disposed between the first powered vehicle and the second powered vehicle.

In another aspect, the control arbitration module is configured to direct one of the first and second control modules to be a primary control module that generates the control signals with the other of the first and second control modules being a secondary control module that receives and implements the control signals from the primary control module based on a designated operating condition of the vehicle consist.

In another aspect, the control arbitration module is configured to direct the first control module to be the primary control module when the vehicle consist is operating according to a distributed power operation.

In another aspect, the control arbitration module is configured to direct the second control module to be the primary control module when the vehicle consist is traveling according to the control signals generated by the energy management module.

In another aspect, the control arbitration module is configured to change the first control module from the secondary control module to the primary control module when a switching event of the vehicle consist is detected.

In another aspect, the switching event includes an operator disposed on-board the first powered vehicle changing at least one of a throttle setting or a brake setting of the first powered vehicle.

In another aspect, the trip profile is based on one or more characteristics of at least one of the vehicle consist, the trip, or a track along which the vehicle consist is to travel.

In another aspect, the first control module is not configured to control the tractive efforts provided by the first powered vehicle or the second powered vehicle based on the trip profile.

In another aspect, the energy management module is configured to generate the control signals that control the tractive efforts based on a geographic distance between the second powered vehicle and the first powered vehicle.

In another embodiment, a method includes on a first powered vehicle of a vehicle consist, controlling tractive efforts provided by the first powered vehicle and a different, second powered vehicle of the vehicle consist. The first powered vehicle and the second powered vehicle are mechanically coupled by at least a third vehicle. The method also includes switching control of the tractive efforts provided by the first powered vehicle and the second powered vehicle from the first powered vehicle to the second powered vehicle and, on the second powered vehicle, controlling the tractive efforts provided by the first powered vehicle and the second powered vehicle based on a trip profile of a trip of the vehicle consist.

In another aspect, controlling the tractive efforts on the first powered rail vehicle includes coordinating the tractive efforts provided by the first powered vehicle and the second powered vehicle with each other.

In another aspect, the third vehicle is a non-powered vehicle disposed between the first powered vehicle and the second powered vehicle.

In another aspect, controlling the tractive efforts on the first powered rail vehicle and controlling the tractive efforts on the second powered rail vehicle occur during non-overlapping time periods.

In another aspect, the method also includes switching control of the tractive efforts of the first powered vehicle and the second powered vehicle from on-board the second powered vehicle to the first powered vehicle when an operator disposed on-board the first powered vehicle changes at least one of a throttle setting or a brake setting of the first powered vehicle.

In another embodiment, another system includes a first control module that is configured for operative coupling on-board a first powered vehicle of a vehicle consist. The first control module is further configured to generate first control signals that control tractive efforts provided by the first powered vehicle and a different, second powered vehicle of the vehicle consist. The first powered vehicle and the second powered vehicle are mechanically coupled by at least a third vehicle. The first control module is configured to cede control of the tractive efforts to a second control module that is operatively coupled with, and receives second control signals from, an energy management module disposed on-board the second powered vehicle based on receipt of a command signal. The second control signals control the tractive efforts provided by the first powered vehicle and the second powered vehicle.

In another aspect, the third vehicle is a non-powered vehicle disposed between the first powered vehicle and the second powered vehicle.

In another aspect, the first control module does not generate the first control signals to control the tractive efforts provided by either the first powered vehicle or the second powered vehicle when the control arbitration module directs the second control module to receive the second control signals generated by the energy management module to control the tractive efforts provided by the first powered vehicle and the second powered vehicle.

In another aspect, the first control module generates the first control signals to regain control of the tractive efforts provided by the first powered vehicle and the second powered vehicle from the second control module when an operator disposed on-board the first powered vehicle changes at least one of a throttle setting or a brake setting of the first powered vehicle.

In another embodiment, another system is provided that includes an energy management module and a control arbitration module. The energy management module is configured to be operatively coupled on-board a second powered vehicle and is configured to generate first control signals that control the tractive efforts provided by a different, first powered vehicle and the second powered vehicle based on a trip profile associated with a trip of a vehicle consist. The vehicle consist includes the first powered vehicle and the second powered vehicle mechanically coupled with each other and separated by at least a third vehicle. The control arbitration module is configured to be communicatively coupled with the energy management module and with a first control module disposed on-board the first powered vehicle to generate second control signals that control the tractive efforts provided by the first powered vehicle and the second powered vehicle. The control arbitration module is configured to determine which of the first control module and the energy management module generates the first control signals or the second control signals that control the tractive efforts provided by the first powered vehicle and the second powered vehicle.

In another aspect, the third vehicle is a non-powered vehicle disposed between the first powered vehicle and the second powered vehicle.

In another aspect, the energy management module is configured to be operatively coupled with a second control module disposed on-board the second powered vehicle that receives and transmits the first control signals generated by the energy management module to control the tractive efforts of the first powered vehicle and the second powered vehicle.

In another aspect, the control arbitration module is configured to direct only one of the first control module or the second control module to transmit the second control signals or the first control signals to control the tractive efforts of the first powered vehicle and the second powered vehicle at a time.

In another aspect, the control arbitration module is configured to switch control of the tractive efforts provided by the first powered vehicle and the second powered vehicle from the second control module back to the first control module when a switching event of the vehicle consist is detected.

In another aspect, the trip profile is based on one or more characteristics of at least one of the vehicle consist, the trip, or a track along which the vehicle consist is to travel.

In another embodiment, a control arbitration module includes a communication submodule, a monitoring submodule, and a switching submodule. The communication submodule is configured to communicate with a first control module disposed on-board a first powered vehicle of a vehicle consist and with a second control module disposed on-board a different, second powered vehicle of the vehicle consist that is mechanically coupled with and separated from the first powered vehicle by at least a third vehicle. The first control module is configured to generate first control signals that coordinate control of tractive efforts provided by the first powered vehicle and the second powered vehicle. The second control module is configured to receive second control signals from an energy management module to control the tractive efforts provided by the first powered vehicle and the second powered vehicle based on a trip profile of a trip of the vehicle consist. The monitoring submodule is configured to monitor each of the first control module and the second control module to determine which of the control module and the second control module is controlling the tractive efforts provided by the first powered vehicle and the second powered vehicle. The switching submodule is configured to switch control of the tractive efforts provided by the first powered vehicle and the second powered vehicle between the first control module and the second control module.

In another aspect, the first control module is configured to coordinate the tractive efforts provided by the first powered vehicle and the second powered vehicle with each other.

In another aspect, the third vehicle is a non-powered vehicle disposed between the first powered vehicle and the second powered vehicle.

In another aspect, the switching submodule directs only one of the first control module and the second control module to control the tractive efforts of the first powered vehicle and the second powered vehicle at a time.

In another aspect, the switching submodule is configured to switch control of the tractive efforts provided by the first powered vehicle and the second powered vehicle from the second control module to the first control module when the monitoring module determines that an operator disposed on-board the first powered vehicle changes at least one of a throttle setting or a brake setting of the first powered vehicle.

In another aspect, the trip profile is based on one or more characteristics of at least one of the vehicle consist, the trip, or a track along which the vehicle consist is to travel.

Another embodiment relates to a system comprising a control arbitration module. The control arbitration module is configured to be operably disposed on-board a vehicle consist for communication with an energy management module and with a control module. For example, the control module may be disposed on-board a first powered vehicle of the vehicle consist and the energy management module may be disposed on-board a second powered vehicle of the vehicle consist; the vehicle consist comprises the first powered vehicle and the second powered vehicle mechanically coupled with each other and separated by at least a third vehicle. The control arbitration is configured to assign primary control of tractive efforts of the vehicle consist to the energy management module responsive to a first designated operational condition (e.g., the first and second powered vehicles being communicatively linked and the energy management module being available for operation) and to assign control of the tractive efforts to the control module responsive to a second designated operational condition (e.g., an operator on board the first powered vehicle actuating a throttle or brake system, or the first and second powered vehicles no longer being communicatively linked). "Primary" control refers to an originating point of automatic control, as opposed to acting responsive to a control command from another on-board system. As an example, a DP control module is in primary control when operating as a DP lead based on operator manipulation of the vehicle controls, that is, the DP control module receives signals resulting from operator manipulation of vehicle controls, and based on those signals, generates control signals for the vehicle consist. As another example, an energy management module is in primary control when it generates control signals, based on a trip profile, which are communicated to other on-board systems, and the other on-board systems act in response to the control signals for controlling tractive efforts of the vehicle consist. As another example, if a DP system is acting responsive to control signals generated by an energy management module, the energy management module is in primary control and the DP system is in secondary control.

Another embodiment relates to a method for controlling a rail vehicle consist. The method comprises controlling tractive effort of the vehicle consist from a first powered rail vehicle of the consist, through a distributed power system of the consist; the first powered rail vehicle is a designated distributed powered lead of the consist. The method further comprises switching the first powered rail vehicle from lead to remote distributed power status, and switching a second powered rail vehicle of the consist from remote to lead distributed power status. The second powered rail vehicle is separated from the first powered rail vehicle by at least one non-powered rail vehicle of the consist. The second powered rail vehicle has an energy management system disposed onboard, which is configured to control the consist based on a trip profile. The method further comprises primarily controlling tractive effort of the consist with the energy management system that is on board the second powered rail vehicle. Primary control may include the energy management system generating control signals for controlling the consist through the distributed power system, e.g., the energy management system generates the control signals and the distributed power system communicates the control signals, or DP-specific signals based on the control signals, from the second powered rail vehicle to the first powered rail vehicle and other DP remotes in the consist. In another embodiment, the method further comprises switching primary control from the second powered rail vehicle to the first powered rail vehicle, responsive to a designated operational condition (e.g., an operator in the first powered rail vehicle adjusting a throttle or activating a braking system, or a communication link between the first and second powered rail vehicles failing). In such an embodiment, the first powered rail vehicle may control the consist through the distributed power system, based on operator inputs; the consist is not controlled based on the energy management system.

Another embodiment relates to a method for controlling a rail vehicle consist. The rail vehicle consist includes a first powered rail vehicle and a second powered rail vehicle, which are mechanically linked by at least one intermediate non-powered rail vehicle. The first and second powered rail vehicles are configured for distributed power operations, with the first powered rail vehicle being a designated distributed power lead and the second powered rail vehicle being a designated distributed power remote. (When designated as a distributed power lead, a powered rail vehicle generates control signals for controlling the tractive efforts of any powered rail vehicles in the consist that are designated as distributed power remotes. The control signals are wirelessly or otherwise communicated from the lead to the remotes. The remotes, when designated as such, are responsive to the control signals received from the lead.) The method comprises determining that the second powered rail vehicle has an energy management system on-board, which is operable for potentially controlling the consist based on a trip plan or profile. The method further comprises, if the second powered rail vehicle has an operable energy management system on-board, changing the first powered rail vehicle from the designated distributed power lead to the designated distributed power remote, and changing the second powered rail vehicle from being the designated distributed power remote to the designated distributed power lead. Here, the second powered rail vehicle is in primary control of the consist, and the method further comprises primarily controlling tractive efforts of the vehicle consist from the second powered rail vehicle, using the energy management system on-board the second powered rail vehicle. Primary control may include the energy management system controlling a distributed power control unit of the second rail powered rail vehicle, which in turn generates and communicates DP control signals from the second powered rail vehicle to the first powered rail vehicle (and to other DP remotes in the consist, if any), for controlling tractive efforts of the consist. In another embodiment, the method further comprises changing the first powered rail vehicle back to the designated distributed power lead, and changing the second powered rail vehicle back to the designated distributed power remote, based on an operational condition (examples of which are provided elsewhere), and controlling the consist from the first powered rail vehicle and not according to the energy management system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are example embodiments. Many other embodiments will be apparent to one of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable a person of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for controlling a vehicle consist, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system comprising:
a first control module configured to be disposed on-board a first powered vehicle of a vehicle consist, the first control module configured to form control signals to coordinate tractive efforts provided by the vehicle consist;
a second control module configured to be disposed on-board a second powered vehicle of the vehicle consist, the first and second powered vehicles mechanically coupled with each other by at least a third vehicle in the vehicle consist;
an energy management module configured to be disposed on-board the second powered vehicle and configured to be communicatively coupled with the second control module, the energy management module configured to form control signals that are transmitted by the second control module to control the tractive efforts provided by the first powered vehicle and the second powered vehicle based on a trip profile associated with a trip of the vehicle consist while an operator of the vehicle consist is located on-board the first powered vehicle; and
a control arbitration module configured to be communicatively coupled with the first and second control modules, the control arbitration module configured to determine which of the first and second control modules controls the tractive efforts provided by the vehicle consist, the control arbitration module configured to cause the second control module to control the tractive efforts provided by the vehicle consist when the vehicle consist is operating according to the trip profile, the control arbitration module also configured to switch control of the tractive efforts provided by the vehicle consist to the first control module responsive to the operator manually changing at least one of a throttle setting or a brake setting of the first powered vehicle.

2. The system of claim 1, wherein the first powered vehicle is a lead vehicle and the second powered vehicle is a remote vehicle in a distributed power operation of the vehicle consist.

3. The system of claim 1, wherein the third vehicle is a non-powered vehicle disposed between the first powered vehicle and the second powered vehicle.

4. The system of claim 1, wherein the control arbitration module is configured to direct one of the first and second control modules to be a primary control module that generates the control signals with the other of the first and second control modules being a secondary control module that receives and implements the control signals from the primary control module based on a designated operating condition of the vehicle consist.

5. The system of claim 1, wherein the control arbitration module is configured to switch control of the tractive efforts of the vehicle consist from the second control module to the first control module to responsive to the vehicle consist operating according to a distributed power operation.

6. The system of claim 4, wherein the control arbitration module is configured to direct the second control module to be the primary control module when the vehicle consist is traveling according to the control signals generated by the energy management module.

7. The system of claim 4, wherein the control arbitration module is configured to change the first control module from the secondary control module to the primary control module when a switching event of the vehicle consist is detected.

8. The system of claim 7, wherein the switching event includes the operator disposed on-board the first powered vehicle changing the at least one of a throttle setting or a brake setting of the first powered vehicle.

9. The system of claim 1, wherein the trip profile is based on one or more characteristics of at least one of the vehicle consist, the trip, or a track along which the vehicle consist is to travel.

10. The system of claim 1, wherein the first control module is not configured to control the tractive efforts provided by the first powered vehicle or the second powered vehicle based on the trip profile.

11. The system of claim 1, wherein the energy management module is configured to generate the control signals that control the tractive efforts based on a geographic distance between the second powered vehicle and the first powered vehicle.

12. A method comprising:
on a first powered vehicle of a vehicle consist, controlling tractive efforts provided by the first powered vehicle and a different, second powered vehicle of the vehicle consist, the first powered vehicle and the second powered vehicle mechanically coupled by at least a third vehicle;
switching control of the tractive efforts provided by the first powered vehicle and the second powered vehicle from the first powered vehicle to the second powered vehicle;
on the second powered vehicle, controlling the tractive efforts provided by the first powered vehicle and the second powered vehicle based on a trip profile of a trip of the vehicle consist while an operator of the vehicle consist is disposed on-board the first powered vehicle; and
switching control of the tractive efforts provided by the first powered vehicle and the second powered vehicle from the second powered vehicle back to the first powered vehicle responsive to the operator manually changing at least one of a throttle setting or a brake setting of the first powered vehicle.

13. The method of claim 12, wherein controlling the tractive efforts on the first powered vehicle includes coordinating the tractive efforts provided by the first powered vehicle and the second powered vehicle with each other.

14. The method of claim 12, wherein the third vehicle is a non-powered vehicle disposed between the first powered vehicle and the second powered vehicle.

15. The method of claim 12, wherein controlling the tractive efforts on the first powered vehicle and controlling the tractive efforts on the second powered vehicle occur during non-overlapping time periods.

16. A system comprising:
a first control module configured for operative coupling on-board a first powered vehicle of a vehicle consist, the first control module further configured to generate first control signals that control tractive efforts provided by the first powered vehicle and a different, second powered vehicle of the vehicle consist, the first powered vehicle and the second powered vehicle mechanically coupled by at least a third vehicle;
wherein the first control module is configured to cede control of the tractive efforts to a second control module while an operator of the vehicle consist is disposed onboard the first powered vehicle, the second control module operatively coupled with, and receiving second control signals from, an energy management module disposed on-board the second powered vehicle based on receipt of a command signal, the second control signals controlling the tractive efforts provided by the first powered vehicle and the second powered vehicle; and wherein the first control module is configured to regain control of the tractive efforts from the second control module responsive to the operator manually changing at least one of a throttle setting or a brake setting of the first powered vehicle.

17. The system of claim 16, wherein the third vehicle is a non-powered vehicle disposed between the first powered vehicle and the second powered vehicle.

18. The system of claim 16, wherein the first control module does not generate the first control signals to control the tractive efforts provided by either the first powered vehicle or the second powered vehicle when the second control module receives the second control signals generated by the energy management module to control the tractive efforts provided by the first powered vehicle and the second powered vehicle.

19. The system of claim 1, wherein the control arbitration module also is configured to switch control of the tractive efforts provided by the vehicle consist from the second control module to the first control module or from the first control module to the second control module responsive to a malfunction in at least one of the first control module or the second control module.

20. The system of claim 1, wherein the control arbitration module also is configured to switch control of the tractive efforts provided by the vehicle consist from the second control module to the first control module or from the first control module to the second control module responsive to a loss of communication between the control arbitration module and at least one of the first control module or the second control module.

21. The system of claim 1, wherein the control arbitration module also is configured to switch control of the tractive efforts provided by the vehicle consist from the second control module to the first control module or from the first control module to the second control module responsive to a change in at least one of the throttle setting or the brake setting that is directed by the first control module, the second control module, or the energy management module that exceeds one or more predetermined thresholds.

22. The system of claim 1, wherein the control arbitration module also is configured to switch control of the tractive efforts provided by the vehicle consist from the second control module to the first control module or from the first control module to the second control module responsive to receiving data transmitted from at least one of an operator control unit or a dispatch center disposed off-board the vehicle consist.

23. The system of claim 1, wherein the first control module, the second control module, and the control arbitration module include one or more computer processors.

24. The method of claim 12, further comprising switching control of the tractive efforts provided by the vehicle consist from the second control module to the first control module or from the first control module to the second control module responsive to a malfunction in at least one of the first control module or the second control module.

25. The method of claim 12, further comprising switching control of the tractive efforts provided by the vehicle consist from the second control module to the first control module or from the first control module to the second control module responsive to a loss of communication between the control arbitration module and at least one of the first control module or the second control module.

26. The method of claim 12, further comprising switching control of the tractive efforts provided by the vehicle consist from the second control module to the first control module or from the first control module to the second control module responsive to a change in at least one of the throttle setting or the brake setting that is directed by the first control module, the second control module, or the energy management module that exceeds one or more predetermined thresholds.

27. The method of claim 12, further comprising switching control of the tractive efforts provided by the vehicle consist from the second control module to the first control module or from the first control module to the second control module responsive to receiving data transmitted from at least one of an operator control unit or a dispatch center disposed off-board the vehicle consist.

28. The method of claim 12, wherein at least one of controlling the tractive efforts on the first powered vehicle, switching control of the tractive efforts from the first powered vehicle to the second powered vehicle, controlling the tractive efforts on the second powered vehicle, or switching control of the tractive efforts from the second powered vehicle back to the first powered vehicle is performed with one or more computer processors.

* * * * *

UNITED STATES PATENT AND TRADEMARK OFFICE
CERTIFICATE OF CORRECTION

| | | |
|---|---|---|
| PATENT NO. | : 8,768,544 B2 | Page 1 of 1 |
| APPLICATION NO. | : 13/198091 | |
| DATED | : July 1, 2014 | |
| INVENTOR(S) | : Schroeck et al. | |

It is certified that error appears in the above-identified patent and that said Letters Patent is hereby corrected as shown below:

In the Specification:

In Column 4, Line 33, delete "For, example," and insert -- For example, --, therefor.

In Column 7, Line 27, delete "track 106," and insert -- track 104, --, therefor.

In Column 7, Line 28, delete "track 106" and insert -- track 104 --, therefor.

In Column 11, Line 2, delete "control modules 122." and insert -- control modules 118. --, therefor.

Signed and Sealed this
Thirtieth Day of September, 2014

Michelle K. Lee
*Deputy Director of the United States Patent and Trademark Office*